(12) United States Patent
de Brebisson et al.

(10) Patent No.: US 7,831,785 B2
(45) Date of Patent: Nov. 9, 2010

(54) DATA COLLECTION MANAGEMENT SYSTEM AND METHOD

(75) Inventors: Cyrille de Brebisson, Boise, ID (US); Brian Maguire, Tigard, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 451 days.

(21) Appl. No.: 11/799,399

(22) Filed: Apr. 30, 2007

(65) Prior Publication Data

US 2008/0266132 A1 Oct. 30, 2008

(51) Int. Cl.
*G06F 12/00* (2006.01)
(52) U.S. Cl. .................... 711/159; 711/E12.07
(58) Field of Classification Search .............. 711/159
See application file for complete search history.

(56) References Cited

U.S. PATENT DOCUMENTS

| | | | |
|---|---|---|---|
| 5,708,732 A * | 1/1998 | Merhav et al. | 382/232 |
| 6,978,217 B2 | 12/2005 | Morozumi | |
| 6,985,492 B1 * | 1/2006 | Thi et al. | 370/429 |
| 7,120,449 B1 * | 10/2006 | Muhonen et al. | 455/456.1 |
| 7,397,844 B2 * | 7/2008 | Smee et al. | 375/148 |
| 7,555,081 B2 * | 6/2009 | Keele, Jr. | 375/350 |
| 2003/0161401 A1 | 8/2003 | Shen et al. | |
| 2004/0213345 A1 | 10/2004 | Holcomb et al. | |
| 2005/0045726 A1 | 3/2005 | Terlizzi | |
| 2007/0019714 A1 * | 1/2007 | Bochkovskiy et al. | 375/150 |

FOREIGN PATENT DOCUMENTS

| | | |
|---|---|---|
| JP | 11283332 | 10/1999 |
| JP | 2003057077 | 2/2003 |

OTHER PUBLICATIONS

PCT International Search Report dated Oct. 2, 2008.

* cited by examiner

*Primary Examiner*—Hetul Patel
*Assistant Examiner*—Hamdy S Ahmed

(57) ABSTRACT

A data collection management system comprises collection logic configured to store incoming data in a memory at a collection rate, and memory management logic configured to automatically downsample at least a portion of the stored data in response to a usage level of the memory reaching a threshold.

24 Claims, 3 Drawing Sheets

DATA COLLECTION MANAGEMENT SYSTEM AND METHOD

BACKGROUND

Data collection devices, such as scientific calculators with measurement and storage capabilities, have limited memory capacity. When measurements are collected over an extended time period, the data collection device may be left unattended. If the user sets the data collection interval (e.g. data sampling rate) to be too rapid, and/or leaves the data collection device unattended for too great a time, the capacity of the memory will be exhausted before the user instructs the data measurement device to stop collecting data. If however, the user sets the data collection interval to be too slow, the memory will have unused capacity at the end of the measurement time that could have been used to improve the quality and/or the thoroughness of the measurement data set.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

Figure 1:
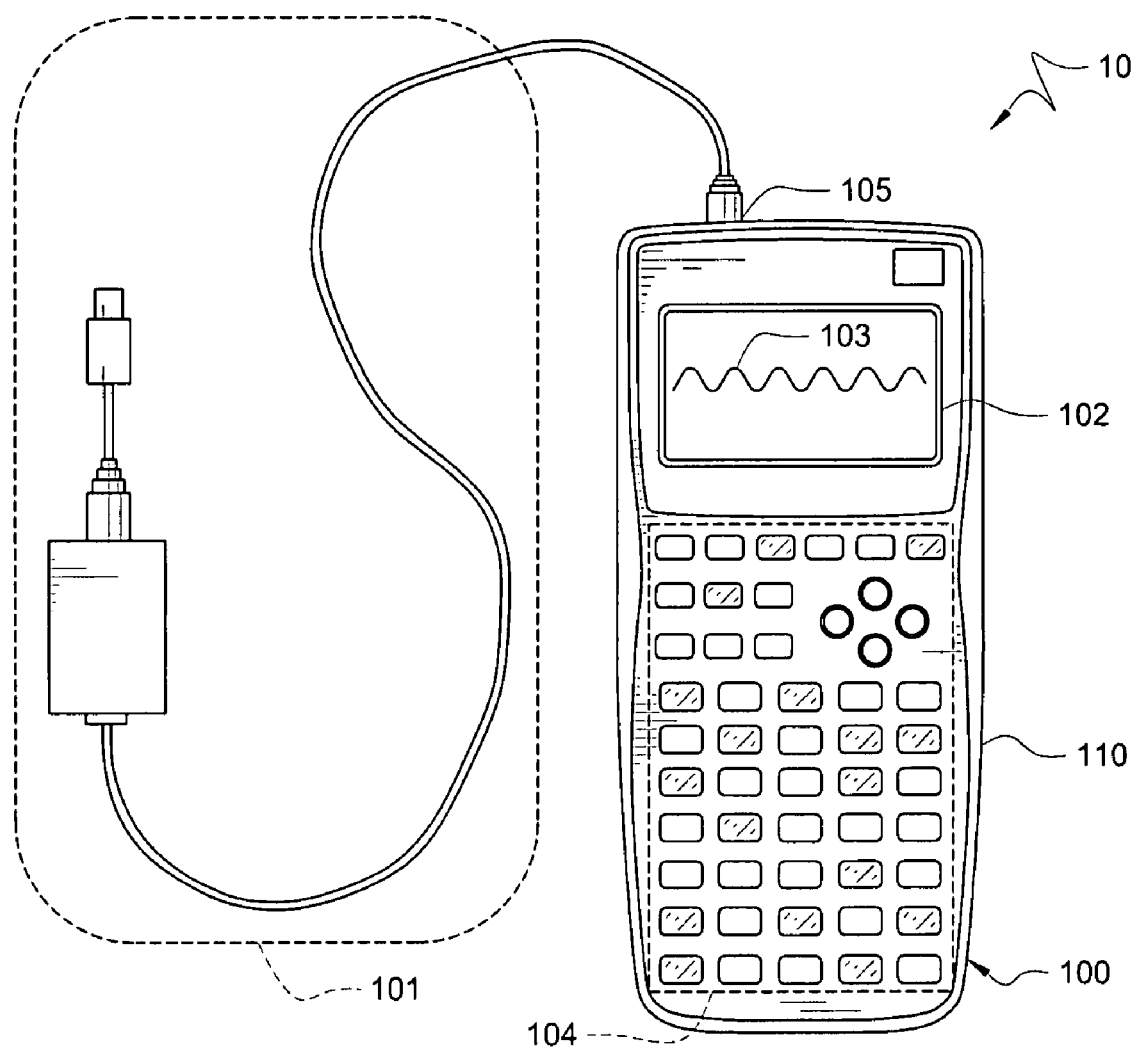
FIG. 1 is a diagram illustrating a data collection device in which an embodiment of a data collection management system is employed to advantage.

FIG. 1 is a diagram illustrating a data collection device 100 in which an embodiment of a data collection management system 10 is employed to advantage. In the embodiment illustrated in FIG. 1, data collection device 100 comprises a hand-held calculator 110; however, it should be understood that data collection device 100 may comprise other test equipment and/or computing systems including, but not limited to, a computer, a video device, a gaming device, an audio device, and a personal digital assistant (PDA). In the illustrated embodiment, a measurement probe 101 is coupled to data collection device 100 and comprises a light meter configured to measure the intensity of incident light. However, it should be understood that measurement probe 101 may be configured to make other measurements in place of or in addition to light intensity, including sound level, temperature, pressure, humidity, chemical composition, electrical quantities, motion, distances, weights and times.

In the embodiment illustrated in FIG. 1, data collection device 100 comprises a display 102 showing a plot 103 of measurement data, for example the intensity of light detected by measurement probe 101. Data collection device 100 further comprises an input interface 104, illustrated as a keypad, for receiving input to data collection device 100. Data collection device 100 also comprises a coupling port 105 configured to couple measurement probe 101 to data collection device 100. Input interface 104 enables data collection device 100 to accept input, for example from a user, specifying an automatic response for maintaining a memory usage level such that available memory capacity is used without being overrun. It should be understood that input interface 104 may comprise another system for enabling data collection device 100 to receive data and/or instructions including, but not limited to, a wireless module, a physical port and a touch-sensitive screen. In some embodiments input interface 104 is configured to receive data and/or instructions through coupling port 105. In the illustrated embodiment, coupling port 105 comprises a physical port; however, in some embodiments coupling port 105 may comprise a wireless interface.

Figure 2:
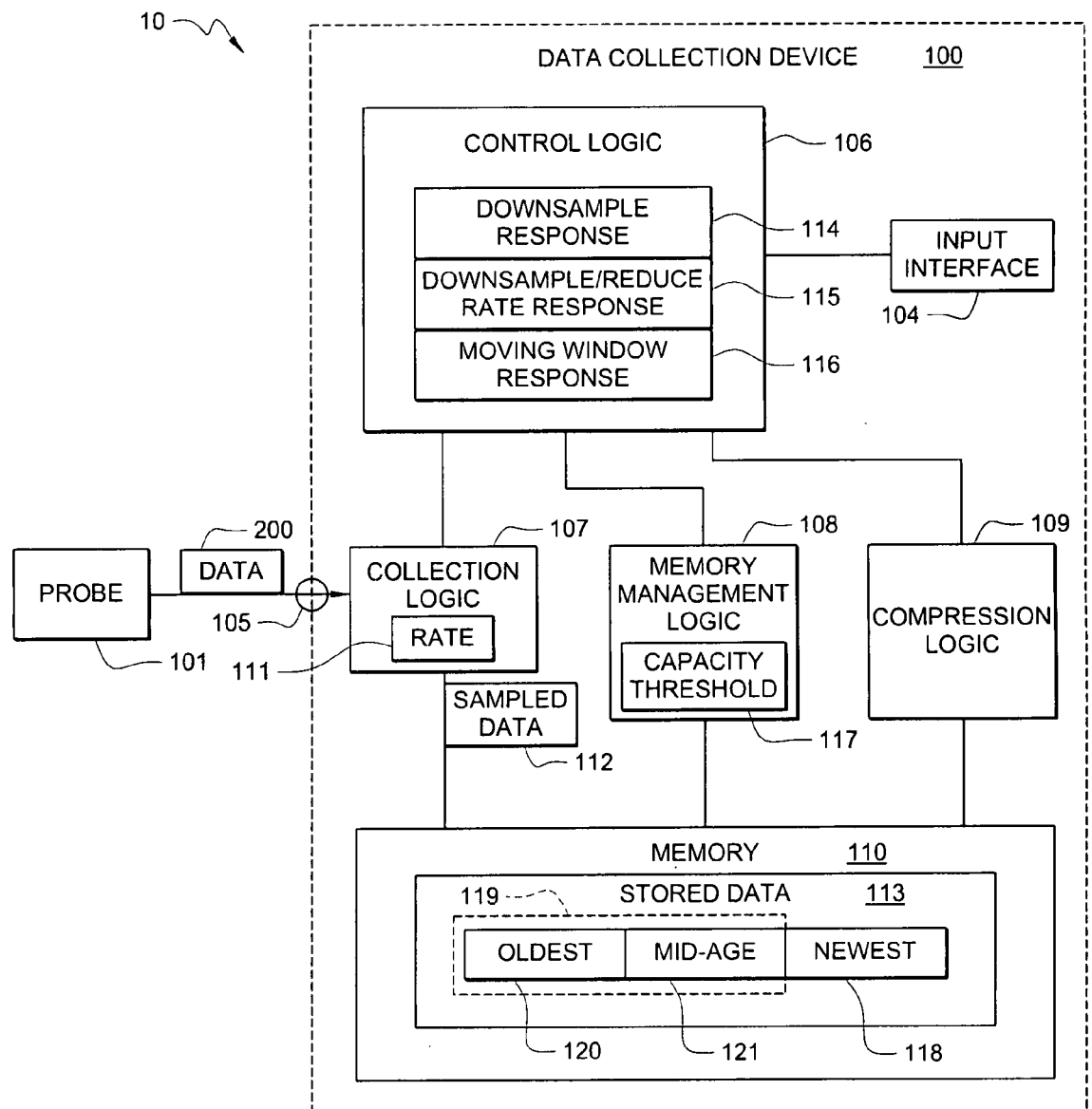
FIG. 2 is a block diagram illustrating the data collection management system of FIG. 1.

FIG. 2 is a block diagram illustrating an embodiment of data collection management system 10. In FIG. 2, measurement probe 101 is illustrated as coupled to data collection device 100 through coupling port 105 to transfer incoming real-time measurement data 200 to data collection device 100. In the embodiment illustrated in FIG. 2, data collection device 100 comprises control logic 106, collection logic 107, memory management logic 108, compression logic 109 and a memory 110. Control logic 106 is coupled to input interface 104, collection logic 107, memory management logic 108 and compression logic 109 for receiving input and controlling and/or setting options and values in collection logic 107, memory management logic 108 and compression logic 109. Control logic 106, collection logic 107, memory management logic 108 and compression logic 109 comprise data and/or executable instructions and may be implemented in hardware, software and/or firmware. Collection logic 107, memory management logic 108 and compression logic 109 are coupled to memory 110 for storing, managing and compressing data in memory 110. In some embodiments, control logic 106, collection logic 107, memory management logic 108 and compression logic 109 reside, at least in part, in memory 110. Memory 110 may comprise volatile and/or non-volatile memory, permanent storage, such as a digital media drive, internal memory and/or memory located external to data collection device 100, such as a universal serial bus (USB) memory module.

In the embodiment illustrated in FIG. 2, collection logic 107 comprises a collection rate setting 111 which, in some embodiments, is set and/or modified by control logic 106. Collection logic 107 is coupled to coupling port 105 for receiving incoming data 200, sampling incoming data 200 to produce sampled data 112, and storing sampled data 112 as a part of stored data 113 in memory 110. In the embodiment illustrated in FIG. 2, control logic 106 comprises three predefined automatic responses 114-116, which may comprise data and/or logic instructions. Responses 114-116 are used to control the value of collection rate setting 111, a capacity threshold 117 in memory management logic 108, and the operation of compression logic 109 which, in some embodiments, compresses at least a portion of stored data 113 residing in memory 110. While control logic 106 is illustrated comprising three responses 114-116, it should be understood that a lesser or greater quantity of predefined automatic responses may be used and, further, that settings, data and/or instructions in responses 114-116 are subject to modification and/or replacement through input interface 104.

In some embodiments, responses 114-116 comprise settings affecting which portion(s) of stored data 113 will be selected for deletion and/or whether collection rate setting 111 will be reduced in response to the usage level of memory 110 reaching and/or nearing capacity threshold 117. For example, in some embodiments, response 114 comprises a downsample response 114 where at least a portion of stored data 113 is downsampled by selecting data points throughout stored data 113 for deletion. For example, when downsampling by a factor of two, every second data point in at least a portion of stored data 113 is deleted, thereby resulting in an effective collection rate that is half of the actual collection rate used prior to the downsampling. However, it should be understood that other downsampling factors may be used. Further, it should be understood that the downsampling factor may vary across portions of stored data 113. It should also be noted that in some embodiments, if stored data 113 is downsampled but collection rate setting 111 is not altered, subsequent incoming real-time measurement data 200 is sampled and stored in memory 110 at the original collection rate (e.g., the collection rate used prior to the implementation of down-sample response 114). The continued use of the original collection rate after downsampling results in stored data 113 comprising multi-resolution data (e.g., data reflecting multiple effective collection rates). It should be further understood that in some embodiments, each time the usage level of memory 110 reaches capacity threshold 117, downsample response 114 is iterated, thereby resulting in stored data 113 having subsets of measurement data reflecting different effective collection rates. In some embodiments of data collection management system 10, stored data 113 may comprise a greater or lesser quantity of different effective collection rates.

In some embodiments, response 115 comprises a downsample/reduce rate response 115 where at least a portion of stored data 113 is downsampled and collection rate setting 111 is automatically reduced. Under downsample/reduce rate response 115, incoming data 200 is sampled at a reduced collection rate to produce sampled data 112 that fills memory 110 at a slower rate than before downsample/reduce rate response 115 was implemented. In some embodiments, downsample/reduce rate response 115 may be iterated each time the usage level of memory 110 reaches or nears capacity threshold 117. In some embodiments, collection rate setting 111 is reduced to match the effective collection rate of at least a portion of stored data 113 after downsampling. For example, if stored data 113 is downsampled by a factor of two, collection rate setting 111 is halved, whereas if stored data 113 is downsampled by a factor of four (i.e., keeping only one of every four points), collection rate setting 111 is also reduced by a factor of four. However it should be understood that collection rate setting 111 may be reduced by a different factor than the downsampling factor.

In some embodiments, response 116 comprises a moving window response 116 where at least a portion of stored data 113 is selected for deletion based on age, such as deleting the oldest data. Thus, in this example, moving window response 116 creates a moving window that retains the most recently-acquired incoming data 200. In conjunction with the creation of the moving window, collection rate setting 111 may either be retained or reduced based on settings in moving window response 116 resulting from input received by control logic 106 through input interface 104. It should be understood that in some embodiments, control logic 106 may be configured to use various ones of responses 114-116 such as, for example, using response 116 initially and then switching to response 114 after a predetermined length of time. Further, in some embodiments, compression logic 109 compresses stored data 113 to preserve space in memory 110, and that the data compression may be performed in conjunction with or independently from responses 114-116.

In some embodiments, memory management logic 108 monitors the usage level of memory 110, compares the usage level with threshold 117, and implements selected ones of responses 114-116 as directed by control logic 106. In some embodiments, threshold 117 comprises: 1) a memory-full threshold measured in amount and/or percentage of memory 110 used; 2) a size of stored data 113 measured in amount and/or percentage of memory 110; or 3) a memory-free threshold indicating the amount of memory 110 available for storing further sampled data. It should be understood that threshold 117 may be otherwise defined. Thus, by enabling memory 110 to reach a predetermined usage threshold and then implementing a predefined automatic response (e.g., responses 114-116) for reducing further memory usage, memory management logic 108 enables data collection device 100 to maintain a usage level of memory 110 between a minimum level and a maximum level. For example, the maximum level is the memory usage level prior to the implementation of one of responses 114-116, whereas the minimum level is the memory usage level after the implementation of one of responses 114-116. In some embodiments, memory management logic 108 further reports to control logic 106 when threshold 117 is met or is being approached, thereby enabling control logic 106 to modify collection rate setting 111 in collection logic 107 if the options are so set in the selected one of responses 114-116.

In the embodiment shown in FIG. 2, stored data 113 comprises multiple portions based on age such as a newest portion 118 and an older portion 119. Older portion 119 is further divided into an oldest portion 120 and a mid-age portion 121. In FIG. 2, stored data 113 is represented as sampled data 112 expanding the length of stored data 113 with the newest data toward the right. In this representative scheme, downsampling reduces the length of stored data 113, including newest portion 118 and older portion 119, and places all of the reduced length of stored data 113 into older portion 119. Subsequent incoming sampled data 112 repopulates newest portion 118 at the current collection rate. If prior to the downsampling the effective collection rate of older portion 119 had been below the collection rate of newest portion 118, after downsampling, older portion 119 comprises mid-age portion 121 (which is the immediately prior newest portion 118 downsampled a single time), and oldest portion 120 (which is the immediately prior older portion 119) downsampled at least twice.

In embodiments iterating response 114, the representation of stored data 113 is recursive with oldest portion 120 potentially comprising multiple portions, each with a different effective collection rate. In embodiments using response 115 exclusively, in which collection rate setting 111 is further adjusted to match the effective collection rate of the down-sampled older portion 119, all portions 118-121 of stored data will have the same effective collection rate. In embodiments using the moving window response 116, the moving window selects oldest portion 120 for deletion based on age; deletes oldest portion 120; and shifts mid-age portion 121 and newest portion 118 to oldest portion 120 and mid-age portion 121, respectively.

Thus, in the operational manner described above, embodiments of data collection management system 10 provide several advantages. For example, in some embodiments, a user is able to take advantage of the memory capacity of data collection device 100 even if the user does not know what amount of memory 110 is available, how long the experiment will last, and/or how rapidly the real-time measurement data should be sampled. For example, with the illustrated embodiment of data collection management system 10, a user is freed from having to predict the duration of the experiment, determine the amount of available memory 110, and estimate the sample collection rate necessary to capture all the relevant variations in data values. Such estimates have multiple sources of error, including: the duration of the experiment may be shorter or longer than expected; the amount of memory available may be incorrectly estimated due to usage by other functions of data collection device 100, and the real-time measurement data may contain fluctuations that occur more rapidly than the user expected. The potential result of making an incorrect estimate for even one aspect of the measurement is that the data may not contain all the relevant information that is possible given the memory capacity of data collection device 100. The result may even be of such poor quality that the user may need to perform the experiment another time. However, embodiments of data collection management system 10 automatically manage the data collection and increases the likelihood that stored data 113 will more fully utilize the potential data collection capacity of data collection device 100, thereby increasing the likelihood that stored data 113 holds the information desired by the user. Additionally, if memory 110 of data collection device 100 is upgraded (e.g., expanded to add more capacity), in some embodiments, responses 114-116 do not require any modification in order to allow the user to take full advantage of the additional memory.

Figure 3:
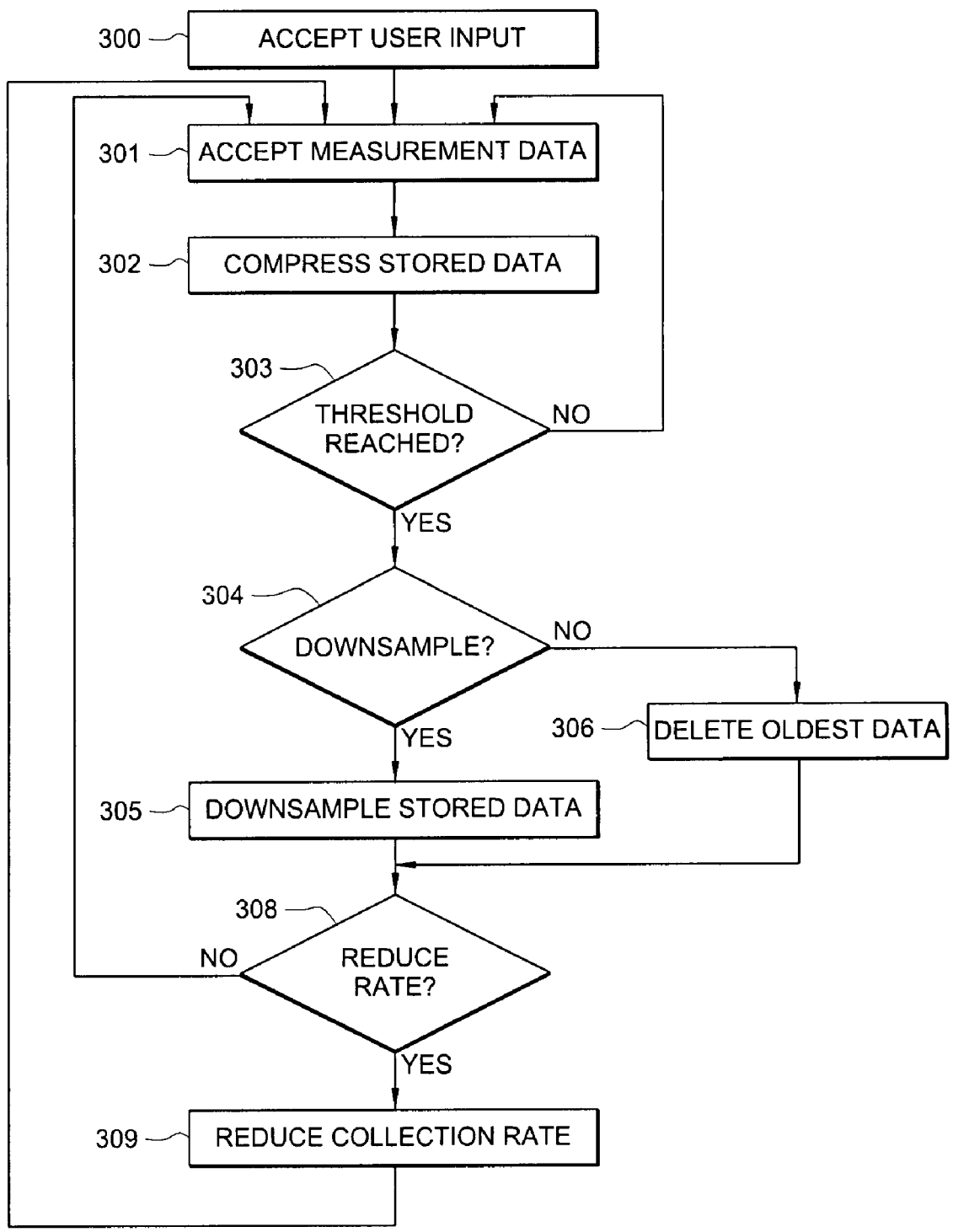
FIG. 3 is a flow diagram illustrating an embodiment of a data collection management method.

FIG. 3 is a flow diagram illustrating an embodiment of a data collection management method. The method begins at block 300, where control logic 106 accepts user input from input interface 104, such as modifying and/or replacing settings, data and/or instructions in responses 114-116 and/or selecting one or ones of responses 114-116 for use in managing a data collection. At block 301, collection logic 107 accepts incoming real-time measurement data 200 from measurement probe 101 through coupling port 105, samples measurement data 200 using the current collection rate setting 111 to produce sampled data 112, and stores sampled data 112 in memory 110 as newest portion 118 of stored data 113. Compression logic 109 compresses stored data 113 at block 302.

At decision block 303, memory management logic 108 determines whether the usage level of memory 110 has reached threshold 117. If threshold 117 has not been reached, the method proceeds to block 301 to continue accepting measurement data. If, at decision block 303 memory management logic 108 determines that the usage level of memory 110 has reached threshold 117, then at decision block 304, memory management logic 108 determines whether stored data 113 is to be downsampled. For example, if user input at block 300 specified that data collection device 100 should use response 114 or response 115, memory management logic 108 will determine that stored data 113 is to be downsampled at decision block 304. Memory management logic 108 then downsamples stored data 113 at block 305, moving older portion 119 into oldest portion 120 and newest portion 118 into mid-age portion 119. If, however, user input at block 300 specified that data collection device 100 should use response 116, memory management logic 108 will determine that stored data 113 is not to be downsampled at decision block 304. Memory management logic 108 will instead create a moving window for stored data 113 by deleting oldest portion 120, moving mid-age portion 121 into oldest portion 120, and moving newest portion 118 into mid-age portion 121 at block 306. In some embodiments, the moving window may be created on a point-by-point basis in which newest portion 118 and oldest portion 120 each comprise a single point, and block 306 occurs for each new incoming point in sampled data 112. In some embodiments, newest portion 118 and oldest portion 120 each comprise multiple-point sets of data so that block 306 does not occur for each new incoming point in sampled data 112.

At decision block 308, control logic 106 determines whether collection rate setting 111 is to be reduced (e.g., based on input received at block 300 such as a user selecting response 115 or response 116 and specifying that the collection rate 111 is to be changed when the moving window is created such that collection rate setting 111 is reduced). If collection rate setting 111 is to be reduced, control logic 106 causes collection logic 107 to update collection rate setting 111 at block 309, thereby sampling subsequent incoming data at a reduced collection rate when the method proceeds to block 301. If, however, collection rate setting 111 is not to be reduced, the method proceeds to block 301, sampling subsequent incoming data at the earlier collection rate and thereby making stored data 113 a multi-resolution data set.

Thus, embodiments of system 10 automatically manages the collection of real-time measurement data ion a manner that uses the available memory capacity but without overrunning the available memory. It should be understood that in the described method, certain functions may be omitted, accomplished in a sequence different from that depicted in FIG. 3, or performed simultaneously. Also, it should be understood that the method depicted in FIG. 3 may be altered to encompass any of the other features or aspects as described elsewhere in the specification. Further, embodiments may be implemented in software and can be adapted to run on different platforms and operating systems. In particular, functions implemented by logic 106, logic 107, logic 117, and logic 109, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semi-conductor system, apparatus, device, or propagation medium.

What is claimed is:

1. A data collection management method, comprising:
storing real-time measurement data in a memory at a collection rate using a processor;
using the processor for automatically downsampling at least a portion of the stored data in response to a usage level of the memory reaching a threshold;
automatically sampling subsequent incoming real-time measurement data using the processor and storing the subsequent data in the memory at the collection rate; and
using the processor to automatically iterate the downsampling so that the stored data includes subsets of measurement data reflecting multi-resolution data and multiple effective collection rates.

2. The method of claim 1, further comprising storing subsequent real-time measurement data in the memory at the collection rate after downsampling.

3. The method of claim 1, further comprising automatically reducing the collection rate in response to the usage level of the memory reaching the threshold.

4. The method of claim 3, wherein the reduced collection rate matches an effective collection rate of the downsampled portion of the data.

5. The method of claim 1, further comprising receiving an input specifying whether the collection rate will change in response to reaching the threshold.

6. The method of claim 1, further comprising compressing at least a portion of the stored data.

7. A data collection management method, comprising:
storing real-time measurement data in a memory at a collection rate using a processor of the calculator;

using the processor for automatically selecting at least one predefined automatic response for reducing a usage level of the memory in response to reaching a capacity threshold for the memory; and using the processor to automatically iterate the automatic response so that stored data includes subsets of measurement data reflecting multi-resolution data and multiple effective collection rates.

8. The method of claim 7, wherein the at least one predefined automatic response comprises downsampling at least a portion of the stored data and storing subsequent real-time measurement data at the collection rate.

9. The method of claim 7, wherein the at least one predefined automatic response comprises downsampling at least a portion of the stored data and storing subsequent real-time measurement data at a reduced collection rate.

10. The method of claim 7, wherein the at least one predefined automatic response comprises selecting a portion of the stored data for deletion based on age.

11. A data collection management system, comprising:
collection logic configured to store incoming real-time measurement data in a memory at a collection rate;
memory management logic configured to automatically downsample at least a portion of the stored data in response to a usage level of the memory reaching a threshold; and
a processor configured to sample subsequent incoming real-time measurement data and to store the subsequent data in the memory at the collection rate, wherein the processor is configured to automatically iterate the downsamplinq so that the stored data includes subsets of measurement data reflecting multi-resolution data and multiple effective collection rates.

12. The system of claim 11, further comprising control logic configured to receive an input indicating a selection of at least one predefined automatic response for reducing the usage level of the memory in response to reaching the threshold.

13. The system of claim 11, further comprising compression logic configured to automatically compress the stored data.

14. The system of claim 11, wherein the memory management logic is further configured to create a moving window for the stored data.

15. The system of claim 11, wherein the collection logic is further configured to automatically reduce the collection rate for storing incoming data in response to the usage level of the memory reaching the threshold.

16. A data collection management method comprising:
storing real-time measurement data in a memory at a collection rate using a processor; and
maintaining a usage level of the memory between a minimum level and a maximum level by automatically deleting a portion of the stored data in response to the usage level reaching a threshold;
automatically sampling subsequent incoming real-time measurement data using the processor and storing the subsequent data in the memory at the collection rate; and
using the processor to automatically iterate the deleting a portion so that the stored data includes subsets of measurement data reflecting multi-resolution data and multiple effective collection rates.

17. The method of claim 16, wherein automatically deleting the portion of the stored data comprises downsampling the stored data.

18. The method of claim 16, wherein automatically deleting the portion of the stored data comprises creating a moving window for the stored data.

19. The method of claim 16, wherein maintaining the usage level comprises reducing the collection rate.

20. The method of claim 16, further comprising receiving an input specifying at least one automatic response for maintaining the usage level in response to reaching the threshold.

21. A data collection management system, comprising:
collection logic configured to store incoming data in a memory at a collection rate;
memory management logic configured to automatically downsample at least a portion of the stored data in response to a usage level of the memory reaching a threshold;
control logic configured having a plurality of user-selectable responses used to control a value of the collection rate and the threshold; and
a processor configured to sample subsequent incoming real-time measurement data and to store the subsequent data in the memory at the collection rate, wherein the processor is configured to automatically iterate the downsampling so that the stored data includes subsets of measurement data reflecting multi-resolution data and multiple effective collection rates.

22. The system of claim 21, further comprising compression logic configured to automatically compress the stored data.

23. The system of claim 21, wherein the memory management logic is further configured to create a moving window for the stored data.

24. The system of claim 21, wherein the collection logic is further configured to automatically reduce the collection rate for storing incoming data in response to the usage level of the memory reaching the threshold.

* * * * *

UNITED STATES PATENT AND TRADEMARK OFFICE
CERTIFICATE OF CORRECTION

| | | |
|---|---|---|
| PATENT NO. | : 7,831,785 B2 | Page 1 of 1 |
| APPLICATION NO. | : 11/799399 | |
| DATED | : November 9, 2010 | |
| INVENTOR(S) | : Cyrille De Brebisson et al. | |

It is certified that error appears in the above-identified patent and that said Letters Patent is hereby corrected as shown below:

In column 7, line 31, in Claim 11, delete "downsamplinq" and insert -- downsampling --, therefor.

Signed and Sealed this
Twenty-fourth Day of May, 2011

David J. Kappos
*Director of the United States Patent and Trademark Office*